United States Patent [19]

Hunt

[11] Patent Number: 5,193,950
[45] Date of Patent: Mar. 16, 1993

[54] ADJUSTABLE BORING HEAD

[75] Inventor: Carl E. Hunt, White Lake, Mich.

[73] Assignee: GTE Valenite Corporation, Troy, Mich.

[21] Appl. No.: 749,735

[22] Filed: Aug. 26, 1991

[51] Int. Cl.⁵ .............................................. B23B 29/08
[52] U.S. Cl. ...................................... 408/153; 408/181
[58] Field of Search ........................ 408/153, 181, 185

[56] References Cited

U.S. PATENT DOCUMENTS

| | | | |
|---|---|---|---|
| 2,093,743 | 9/1937 | Steiner | 408/181 |
| 3,044,323 | 7/1962 | Sweeny | 408/185 |
| 4,784,536 | 11/1988 | Pfalzgraf | 408/181 |

FOREIGN PATENT DOCUMENTS 627720  8/1949  United Kingdom ................. 408/185

Primary Examiner—Daniel W. Howell

[57] ABSTRACT

An adjustable boring head that includes a main body member having a longitudinal axis, and a boring bar holder adjustably mounted in the main body member for slidable adjustments transversely across the longitudinal axis. A square cross-sectioned slideway is formed in an end face of the main body member for precise guidance and rigid support of the boring bar holder. The boring bar holder is a unitary one piece structure having a deep socket opening for rigidly mounting the boring bar.

11 Claims, 2 Drawing Sheets

ADJUSTABLE BORING HEAD

BACKGROUND OF THE INVENTION

1. Field of the Invention

This invention relates to boring tools, and especially a boring head adapted to adjustable mount a boring bar in a position extending parallel to the boring head rotational axis.

2. Description of Prior Developments

U.S. Pat. No. 3,044,323 to A. N. Sweeny discloses an adjustable head for a boring bar, wherein the boring bar has its rear end portion extending into a socket opening in a transversely adjustable slide structure. A manually rotatable screw means is provided for moving the slide structure incrementally in the transverse direction.

One potential disadvantage of the patented Sweeney arrangement is the fact that the socket opening in the slide structure has a relatively small axial length (slightly less than the diameter of the slide structure); the connection between the boring bar and slide structure may not be sufficiently rigid to prevent deflection or dislocation of the boring bar.

SUMMARY OF THE INVENTION

This invention relates to an offset boring head of the type shown in Sweeney U.S. Pat. No. 3,044,323. In one form of the invention the boring bar holder comprises a slide structure having a square cross section. The main body member of the boring head has a transverse end face and a square cross-section guidance slot machined therein; the slide structure is slidably positioned in the guidance slot for linear motion therealong. A flat closure plate is bolted to the end face of the main body member to retain the slide structure within the guidance slot. An elongated guide opening in the closure plate accommodates an axially-extending neck portion of the boring bar holder.

As an important feature of the invention, the boring bar holder has a relatively long axial length measured parallel to the axis of the main body member; a deep socket opening is provided in the boring bar holder for secure support and retention of the boring bar. Another feature of the invention is the slide-guide relationship between the boring bar holder and the main body member. The main body member has an integral projecting support element projecting from its end face for engagement with a side surface of the boring bar holder, so as to effectively lengthen the guidance support area for the boring bar holder and provide increased resistance against deflection of the boring bar due to cutting forces. This is especially advantageous when the boring bar is relatively long.

THE DRAWINGS

DESCRIPTION OF A PREFERRED EMBODIMENT OF THE INVENTION

Figure 1:
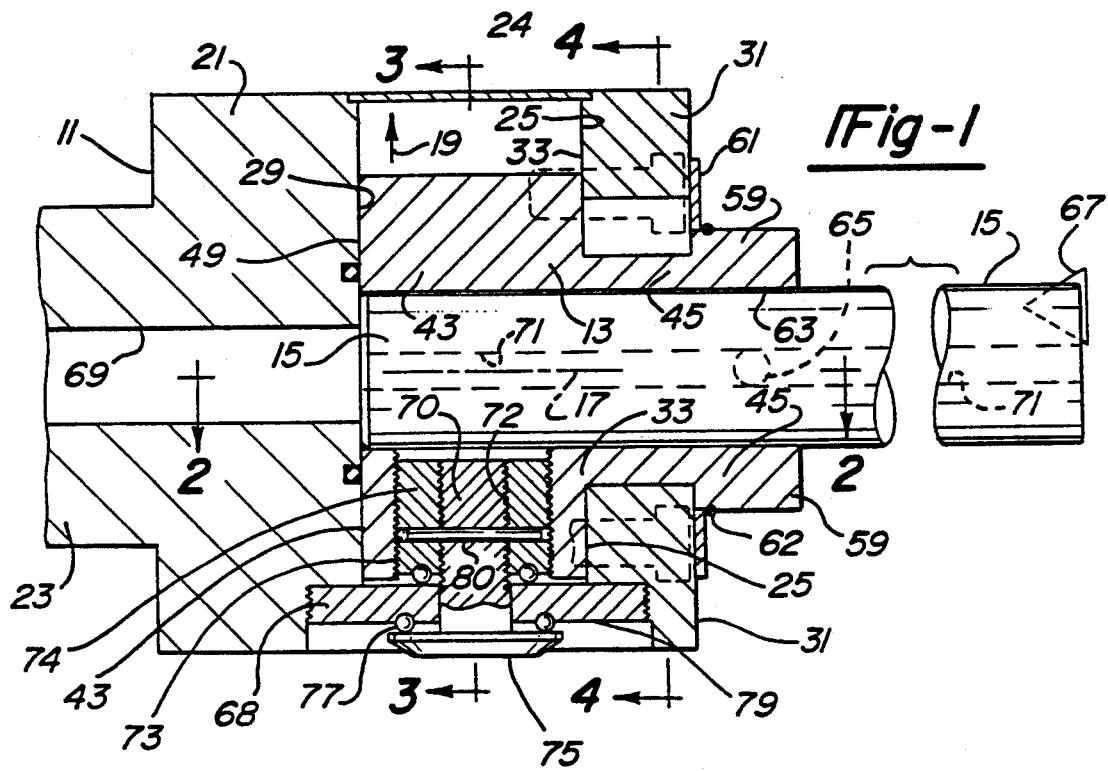
FIG. 1 is a longitudinal sectional view taken through a boring head embodying this invention.

FIG. 1 shows a boring head that includes a main body member 11, and a boring bar holder 13 carried in member 11 for gripment of a boring bar 15. Holder 13 is slidably adjustably mounted in body member 1 for infinite adjusting movements transverse to longitudinal axis 17 of the boring bar; numeral 9 denotes the direction of adjustment of holder 13.

Body member 11 comprises a cylindrical section 21 and a reduced diameter shank 23 adapted to fit into the spindle of a cutting machine for rotation of body member 11 around longitudinal axis 17. The general relationship is similar to that depicted in aforementioned U.S. Pat. No. 3,044,323.

Body member 11 has a transverse end face 25; a rectangular slot 24 is machined into end face 25 to form a slideway for slidable guidance of boring bar holder 13. The rectangular slot is defined by two parallel slot side surfaces 27 and 28 extending normal to end face 25, and a slot rear surface 29 extending parallel to end face 25. The defined slideway has a rectangular cross section.

A flat closure plate 31 is seated against end face 25 of body member 11 to partially close the guidance slot in member 11. Face 33 of plate 31 forms one of the four slideway surfaces that retain boring bar holder 13 in position on member 11. An L-shaped opening 36 is formed through closure plate 31 to permit the boring bar holder to extend rightwardly from the slideway beyond the closure plate. The L-shaped opening is defined by first and second planar surfaces 35 and 37 formed as planar extensions of slot side surfaces 28 and 27, and third and fourth planar surfaces 39 and 41 extending right angularly from edge surfaces 35 and 37 to the peripheral edge of plate 31.

Figure 5:
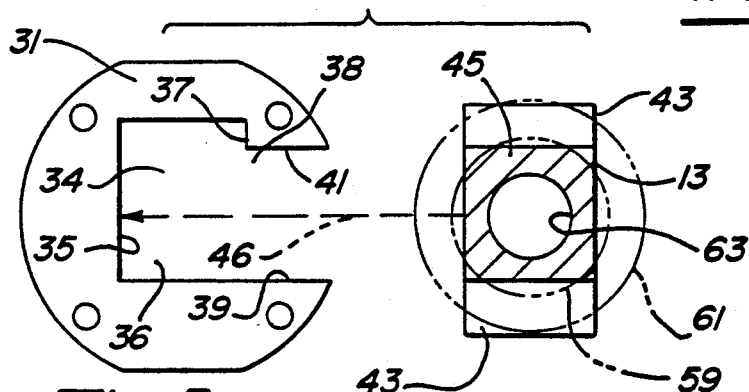
FIG. 5 is an end view of a closure plate and boring bar holder used in the FIG. 1 construction. The closure plate and holder are shown in a detached condition.

The L-shaped opening 36 has a first leg 34 thereof aligned with the guidance slot in body member 11, and a second leg 38 designed to facilitate assembly of boring bar holder 13 onto the closure plate. The boring bar holder has a T configuration in side elevation (FIG. 1). The head of the T comprises a straight slide portion 43 adapted to fit into the guidance slot in member 11; the other portion of the T comprises a neck portion 45 extending through the L-shaped opening 36. The boring bar holder is assembled to plate 31 by moving the holder laterally as shown by arrow 46 in FIG. 5; neck portion 45 moves through leg opening 38 into leg opening 36. After the boring bar holder 13 has been assembled to closure plate 31 (by movement thereof in the arrow 46 direction) the closure plate 31-boring bar holder 13 assembly can be advanced toward end face 25 of member 11 so that slide portion 43 of the boring bar holder 13 enters into the guidance slot 24 in member 11. Slide portion 43 has two flat side faces 47 in slidable facial contact with slot side surfaces 27 and 28, and a flat end face 49 in slidable facial contact with slot rear surface 29.

Figure 2:
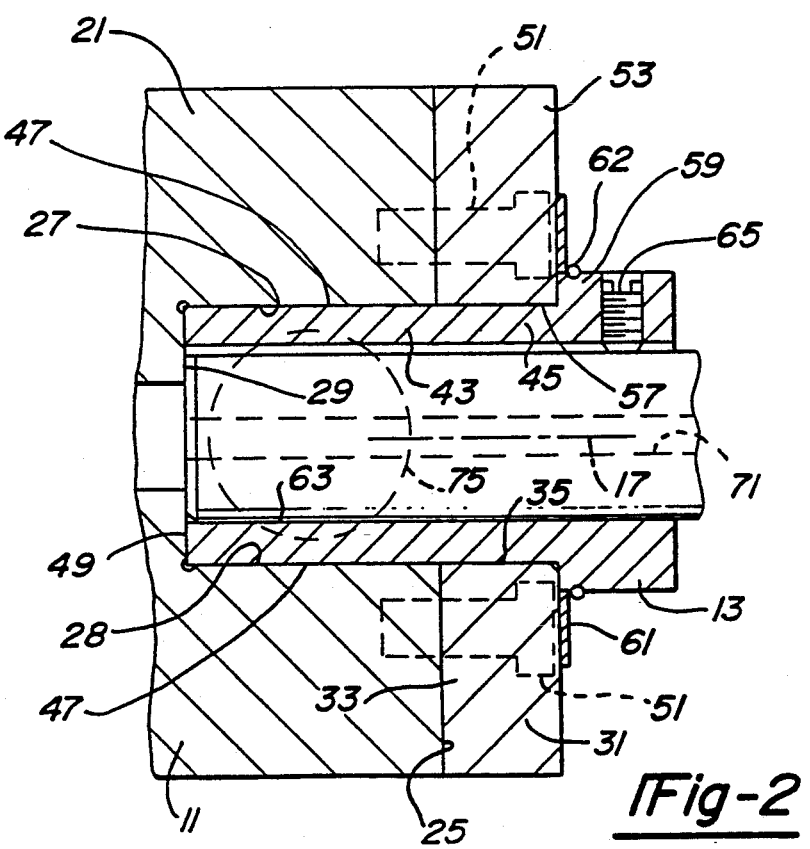
FIG. 2 is a sectional view taken on line 2—2 in FIG. 1.
Figure 3:
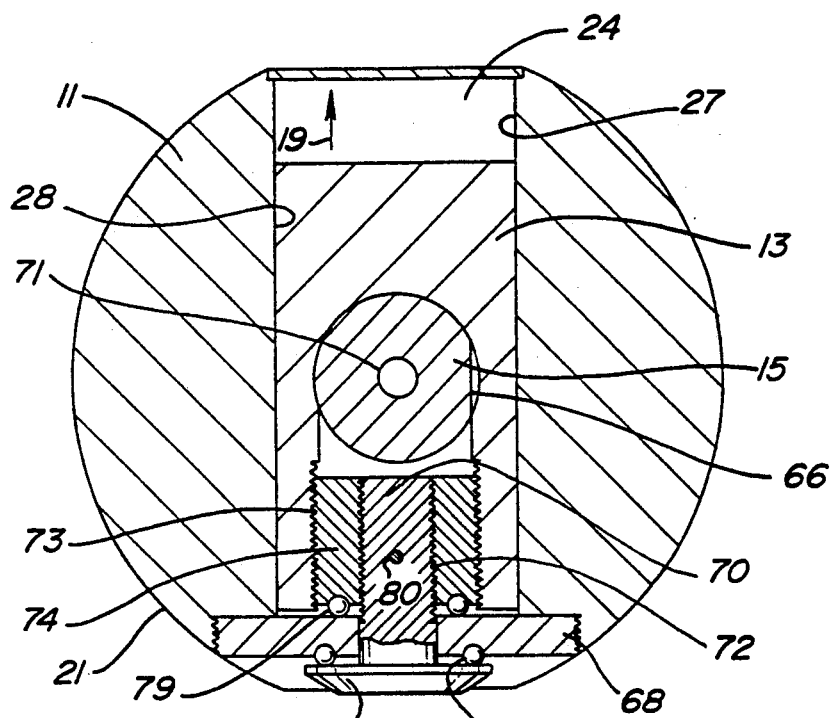
FIG. 3 is a sectional view taken on line 3—3 in FIG. 1.
Figure 4:
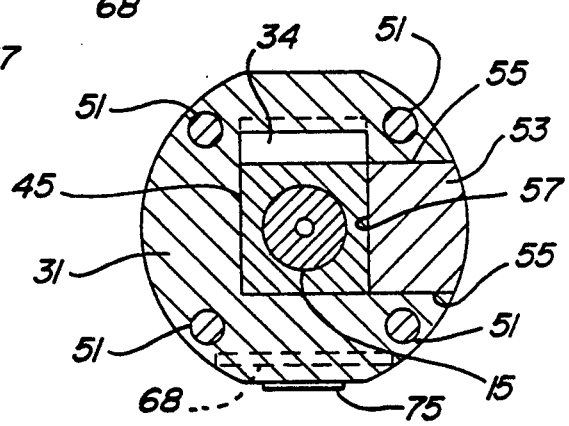
FIG. 4 is a sectional view on a reduced scale, taken along line 4—4 in FIG. 1.

Closure plate 31 is secured to body member 11 by four screws 51. Correct (precise) alignment of the plate 31 relative to member 11 is provided by means of a projecting support element 53 formed as an integral right angular extension from end face 25 of member 11. When plate 31 is positioned against end face 25 support 53 fits within leg 38 of L-shaped opening 36. Side surfaces 55 of the support 53 are then in facial contact with edge surfaces 39 and 41 of the L-shaped opening. Surface 57 of the support is in planar alignment with slot side surface 27, as viewed in FIG. 2. It is essential that surfaces 57 and 27 be precisely in the same plane (as shown in FIG. 2) to provide support for the boring tool.

As an optional feature of the invention, the boring bar holder 13 includes a circular enlargement 59 integral with neck portion 45 of the holder. A relatively thin circular plate 61 surrounds the outer peripheral surface of circular enlargement 59 for covering the L-shaped opening 36 in closure plate 31. In order to keep foreign matter out of the L-shaped opening 36 when the tool is adjusted, plate 61 is biased against the face of closure plate 61 by an 0 ring (or snap ring) 62 positioned in a groove in circular englargement 59. Enlargement 59 increases the axial length of holder 13, and thus provides a more extensive support surface for boring bar 15; enlargement 59 also provides an accessible location for set screw 65. The boring bar has a flatted circular cross section that fits into a socket opening 63 formed in holder 13; a set screw 65 (FIG. 1) engages the flat on the bar to provide tool point orientation and secure the bar into the holder. Liquid coolant is supplied to the cutting insert 67 via a passage 69 in body member 11 and a second passage 71 in boring bar 15.

As previously noted, boring bar holder 13 can be adjusted transversely as indicated by arrow 19 (FIG. 1); slide portion 43 is movable within guidance slot 24 to maintain holder 13 in adjusted positions wherein the axis of boring bar 15 is maintained parallel with longitudinal axis 17 of body member 11. The manual means for infinitely adjusting boring bar holder 13 in the arrow 19 direction can be varied as to structural detail. The manual mechanism shown in FIG. 1 comprises a cover plate 68 threadingly mounted within body member 11. A manually rotatable screw 70 extends through plate 68 into an annular nut 74 that has a screw thread connection 73 with slide portion 43 of the boring bar holder; screw 70 has a threaded connection 72 with the nut for assembly preloading purposes only. Screw 70 has a manual knob 75 equipped with gradations denoting the relative position of the boring tool in relation to axis 17.

In order to minimize frictional drag forces a first ring of anti-friction balls 77 is provided between knob 75 and cover plate 68, and a second ring of anti-friction balls 79 is provided between plate 68 and 74. A pin 80 is inserted transversely through screw 70 and nut 74 to prevent relative rotation between the two components. When knob 75 is rotated in either direction nut 74 maintains its position relative to cover plate 68. In one case the nut turns with screw 70 to advance slide portion 43 away from plate 68. In the other case the nut turns with screw 70 in the opposite direction to pull the slide portion 43 toward plate 68.

A principal feature of the invention is the deep nature of socket 63; as seen in FIG. 1 and 2, the socket opening extends rightwardly a considerable distance beyond the plane of the transverse guidance slot 24.

Another feature of the invention is the one-piece nature of boring bar holder 13, such that tolerances can be maintained without the difficulty posed by assembling two components into a single precision component.

A further feature of the invention is the formation of the transverse slideway as a rectangular cross-sectioned slot 24 in body member 11. The slot dimension can be closely controlled to have a precision fit with slide portion 43 of the boring holder.

Another feature of interest is the support element 53 formed as an integral extension of body member 11, whereby surfaces 27 and 57 form a continuous elongated holder support surface (as viewed in FIG. 2). The boring tool is oriented in holder 13 so that this elongated support surface faces the cutting load forces, thereby minimizing (or eliminating) transverse deflection of bar 15 due to the cutting loads.

The drawings necessarily show specific structural relationships used in practice of the invention. However, it will be appreciated that variations and modifications can be used while still practicing the invention.

What is claimed is:

1. A boring head comprising a body member having a longitudinal axis, and an end face extending normal to said axis; a transverse linear slot in said end face forming a slideway; a closure plate seated against said end face to form one wall of the slideway; said closure plate having an L-shaped opening therethrough; one leg of said opening being aligned with said slot, the other leg of said L-shaped opening extending from said one leg to an edge of the plate; a boring bar holder having a straight slide portion slidably positioned in said slideway for adjusting movements transverse to the body member longitudinal axis, and a neck portion extending from said slide portion through said one leg of the L-shaped opening; and a socket opening extending through the boring bar holder parallel to the aforementioned axis for receiving a boring bar therein; said other leg of the L-shaped opening being wide enough to permit the neck portion of the boring bar holder to pass transversely therethrough during assembly of the boring bar holder to the closure plate.

2. The boring head of claim 1, wherein said slideway has a square cross section.

3. The boring head of claim 2, wherein said slide portion of the boring bar holder has two flat side faces in slidable engagement with opposed side surfaces of said linear slot; said neck portion of the boring bar holder having two flat side faces in planar alignment with the slide portion side faces.

4. The boring head of claim 2, wherein the flat side faces of the neck portion ar slidably engaged with side edges of said one leg of the L-shaped opening.

5. The boring head of claim 1, wherein said body member has an integral support element extending from said end face into the other leg of the L-shaped opening for engagement with a side surface of the boring bar holder.

6. The boring head of claim 5, wherein said support element fully occupies the other leg of the L-shaped opening; said support element having a surface thereof in slidable contact with said neck portion of the boring bar holder.

7. A boring head comprising a body member having a longitudinal axis, and an end face extending normal to said axis; a transverse rectangular slot in said end face forming a slideway, said slot being comprised of two parallel slot side surfaces extending normal to said end face and a slot rear surface extending parallel to said end face; a closure plate seated against said end face to form one wall of the slideway; said closure plate having an L-shaped opening therethrough; said L-shaped opening being defined by first and second planar surfaces aligned with said slot side surfaces, and third and fourth planar surfaces extending right angularly from the first and second edge surfaces; said first and second planar surfaces defining one leg of the L-shaped opening, said third and fourth planar surfaces defining the other leg of the L-shaped opening a boring bar holder having a flat surfaced slide portion slidably positioned in said slideway for adjusting movements transverse to the body member longitudinal axis, and a neck portion extending from said slide portion though said one leg of the L-shaped opening; said slide portion having flat side faces slidably engaged with the slot side surfaces, and an end face slidably engaged with the slot rear surface; said neck portion having two side faces formed as planar extensions of the slide portion side faces whereby the neck portion can be moved within said one leg of the L-shaped opening; said boring bar holder having a socket opening extending therethrough on an axis that parallels the longitudinal axis of the body member, whereby a boring bar seated within the socket opening can be adjusted in a direction transverse to the body member axis.

8. The boring head of claim 7, and further comprising manually operated means for transversely adjusting the boring bar holder; said manually operated means comprising a threaded opening in the slide portion of the boring bar holder, a cover plate carried by said body member at one end of the slideway, and a manually rotatable screw means extending through the cover plate in meshed engagement with the threaded opening.

9. The boring head of claim 7, and further comprising a flat-surfaced support element extending from said end face of the body member into the other leg of the L-shaped opening; said support element having two side surfaces in facial contact with said third and fourth planar surfaces of the other leg of the L-shaped opening.

10. The boring head of claim 7, wherein said boring bar holder is a one-piece structure.

11. A boring head, comprising a body member having a longitudinal axis and end face extending normal to said axis; a transverse linear slot in said end face, said slot comprising two parallel side surfaces forming a slideway; a closure plate comprising a single plate, seated flatwise against said face to form one end of the slideway; said closure plate having an "L" shaped opening there through; one leg of said "L" shaped opening being aligned with said slot, the other leg of said "L" shaped opening extending from said one leg to an edge of the plate, said opening there through defined at least partially by two parallel edges in planar alignment with the slot side surfaces; a one piece boring bar structure having a straight slide portion slideably positioned in said slideway for adjusting movements transverse to the body member longitudinal axis, and a neck portion extending from said slide portion through said opening in the closure plate whereby the neck portion of the boring bar holder can pass transversely through said other leg of the opening during assembly of the boring bar holder to the closure plate; and a socket opening extending through the boring bar holder parallel to the aforementioned access for receiving a boring bar therein.

* * * * *